(12) United States Patent
Younger

(10) Patent No.: US 9,970,534 B2
(45) Date of Patent: May 15, 2018

(54) METHODS AND SYSTEMS FOR IMPROVING THE OPERATION OF TRANSMISSIONS FOR MOTOR VEHICLES

(75) Inventor: Gilbert W. Younger, El Monte, CA (US)

(73) Assignee: Transgo, LLC, El Monte, CA (US)

( * ) Notice: Subject to any disclaimer, the term of this patent is extended or adjusted under 35 U.S.C. 154(b) by 819 days.

(21) Appl. No.: 13/507,807

(22) Filed: Jul. 30, 2012

(65) Prior Publication Data

US 2013/0037134 A1     Feb. 14, 2013

Related U.S. Application Data

(60) Provisional application No. 61/574,651, filed on Aug. 8, 2011.

(51) Int. Cl.
    *F16H 61/02*           (2006.01)
    *F16H 61/12*           (2010.01)

(52) U.S. Cl.
    CPC .......... *F16H 61/0276* (2013.01); *F16H 61/12* (2013.01); *F16H 2061/0279* (2013.01); *F16H 2061/1264* (2013.01); *Y10T 29/49716* (2015.01); *Y10T 137/7837* (2015.04)

(58) Field of Classification Search
    CPC ................ F16H 61/0276; F16H 61/12; F16H 2061/1264; F16H 2061/0279; Y10T 29/49716
    USPC ................................ 137/536, 543.15, 543.17
    See application file for complete search history.

(56) References Cited

U.S. PATENT DOCUMENTS

| | | | | |
|---|---|---|---|---|
| 1,961,363 A | * | 6/1934 | Humphrey | 137/73 |
| 1,962,740 A | * | 6/1934 | Jaworowski | 137/543.15 |
| 2,011,812 A | * | 8/1935 | Hatcher et al. | 137/543.13 |
| 2,023,189 A | * | 12/1935 | Armstrong | 137/515 |
| 2,040,776 A | * | 5/1936 | Marvin | 137/536 |
| 2,289,946 A | * | 7/1942 | Weatherhead, Jr. | 137/514.3 |
| 3,119,408 A | * | 1/1964 | Ernest | 137/454.5 |
| 3,608,150 A | * | 9/1971 | Laufer et al. | 425/543 |
| 3,878,861 A | * | 4/1975 | Pareja | 137/543.17 |
| 4,172,465 A | * | 10/1979 | Dashner | 137/533.27 |
| 4,228,820 A | * | 10/1980 | Deminski | 137/514.3 |
| 4,449,426 A | | 5/1984 | Younger | |
| 4,711,140 A | | 12/1987 | Younger | |
| 4,790,938 A | | 12/1988 | Younger | |
| 5,253,549 A | | 10/1993 | Younger | |
| 5,540,628 A | | 7/1996 | Younger | |
| 5,624,342 A | | 4/1997 | Younger | |
| 5,636,659 A | * | 6/1997 | Smed | 137/543.13 |
| 5,730,685 A | | 3/1998 | Younger | |
| 5,743,823 A | | 4/1998 | Younger | |
| 5,768,953 A | | 6/1998 | Younger | |
| 5,820,507 A | | 10/1998 | Younger | |
| 5,967,928 A | | 10/1999 | Younger | |

(Continued)

*Primary Examiner* — Jessica Cahill
*Assistant Examiner* — Daphne M Barry
(74) *Attorney, Agent, or Firm* — Mark P. Stone

(57) ABSTRACT

A torque converter check valve has a valve element movable between a closed position and an open position by applying hydraulic pressure to a portion of the valve element and by applying a resilient force by a resilient element acting on another portion of the valve element. A spacer element is provided to act on the valve element and limit movement of the valve element in the direction in which the resilient element is compressed to reduce wear on the resilient element during operation of the torque converter check valve.

20 Claims, 2 Drawing Sheets

(56) References Cited

U.S. PATENT DOCUMENTS

| | | | | |
|---|---|---|---|---|
| 6,099,429 | A | 8/2000 | Younger | |
| 6,117,047 | A | 9/2000 | Younger | |
| 6,163,895 | A * | 12/2000 | Davenport | 4/255.06 |
| 6,287,231 | B1 | 9/2001 | Younger | |
| 6,390,944 | B1 | 5/2002 | Younger | |
| 6,565,472 | B1 | 5/2003 | Younger | |
| 6,699,157 | B2 | 3/2004 | Younger | |
| 6,729,989 | B2 | 5/2004 | Younger | |
| 6,814,680 | B2 | 11/2004 | Younger | |
| 6,871,397 | B2 | 3/2005 | Younger | |
| 6,913,554 | B2 * | 7/2005 | Younger | 475/127 |
| 6,964,628 | B2 | 11/2005 | Younger | |
| 7,128,679 | B2 | 10/2006 | Younger | |
| 7,331,893 | B2 | 2/2008 | Younger | |
| 7,628,016 | B2 * | 12/2009 | Vogt | 60/612 |
| 8,584,700 | B2 * | 11/2013 | Vicars | 137/543.15 |

\* cited by examiner

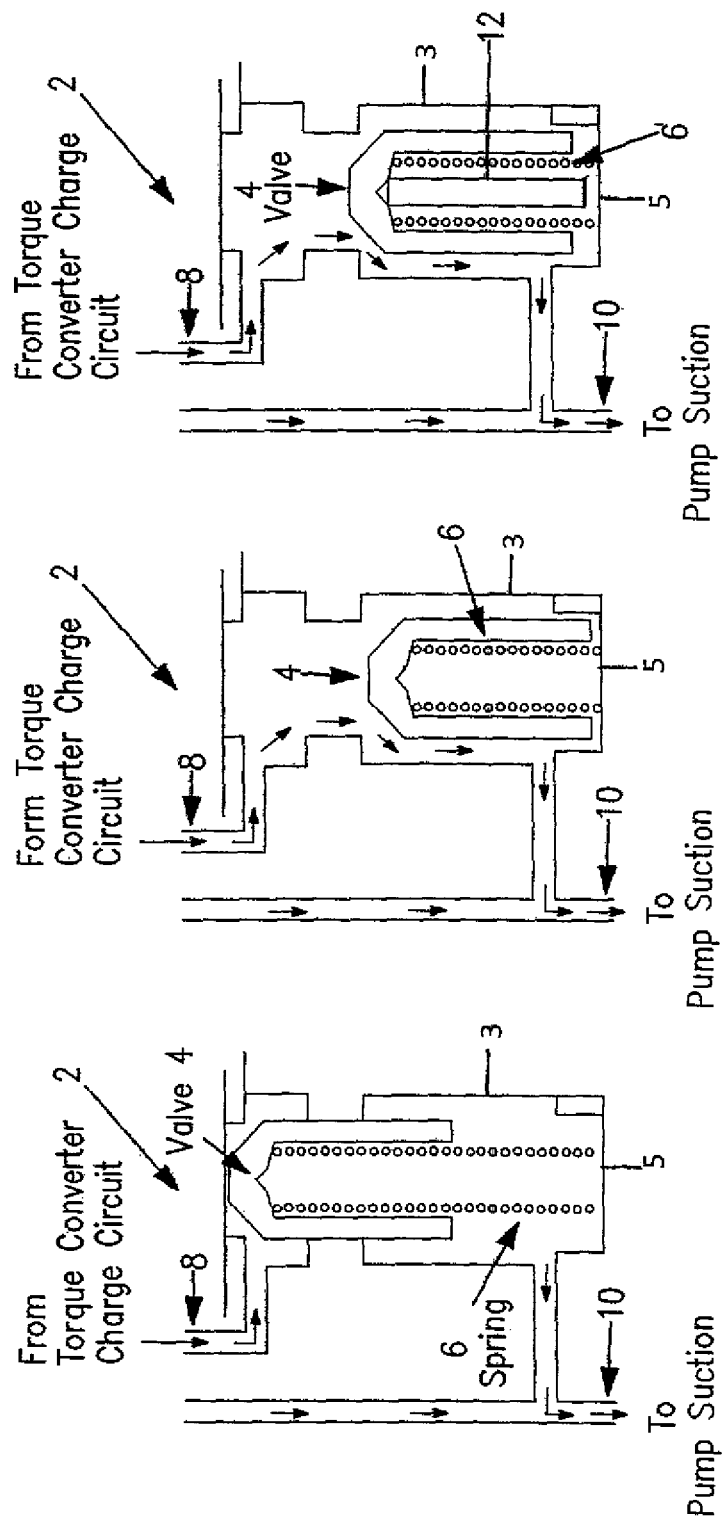

METHODS AND SYSTEMS FOR IMPROVING THE OPERATION OF TRANSMISSIONS FOR MOTOR VEHICLES

The present patent application claims the benefit of U.S. Provisional Patent Application Ser. No. 61/574,651, filed on Aug. 8, 2011, pursuant to 35 U.S.C. 119 (e).

BACKGROUND OF THE INVENTION

The methods and systems of the present invention are directed to the modification and improvement of transmissions for automotive vehicles, more commonly referred to as "factory installed" transmissions, installed in automotive vehicles by an original motor vehicle manufacturer. The invention is more particularly directed to improvements to "factory installed" transmissions for the four speed 98-04 Honda Odyssey, the five speed 98-04 Honda Odyssey, and the Acura 3.2 TL.

The present inventor owns the following United States patents, the disclosures of which are expressly incorporated by reference into the present patent application: U.S. Pat. No. 4,449,426, issued May 26, 1984; U.S. Pat. No. 4,711,140, issued Dec. 8, 1987; U.S. Pat. No. 4,790,938, issued Dec. 13, 1988; U.S. Pat. No. 5,253,549; issued Oct. 19, 1993; U.S. Pat. No. 5,540,628, issued Jul. 30, 1996; U.S. Pat. No. 5,624,342; issued Apr. 29, 1997; U.S. Pat. No. 5,730,685, issued Mar. 24, 1998; U.S. Pat. No. 5,743,823, issued Apr. 28, 1998; U.S. Pat. No. 5,768,953, issued Jun. 23, 1998; U.S. Pat. No. 5,820,507, issued Oct. 7, 1998; U.S. Pat. No. 5,967,928, issued Oct. 19, 1999; U.S. Pat. No. 6,099,429, issued Aug. 8, 2000; U.S. Pat. No. 6,117,047, issued Sep. 12, 2000; U.S. Pat. No. 6,287,231, issued Sep. 11, 2001; U.S. Pat. No. 6,390,944, issued May 21, 2002; U.S. Pat. No. 6,565,472, issued May 20, 2003; U.S. Pat. No. 6,699,157, issued Mar. 2, 2004; U.S. Pat. No. 6,729,989, issued May 4, 2004; U.S. Pat. No. 6,814,680, issued Nov. 9, 2004; U.S. Pat. No. 6,871,397, issued Mar. 29, 2005; U.S. Pat. No. 6,913,554, issued Jul. 5, 2005; U.S. Pat. No. 6,964,628, issued Nov. 15, 2005; U.S. Pat. No. 7,128,679, issued Oct. 31, 2006; and U.S. Pat. No. 7,331,893, issued Feb. 19, 2008.

It is the primary object of the present invention to modify the "factory installed" transmissions for the 4 and 5 speed 98-04 Honda Odyssey and the Acura 3.2 TL transmissions to improve the overall operation and efficiency of these "factory installed" automotive transmissions. The modifications to the "factory installed" transmissions, as more fully described herein, include modification of the torque converter charge circuit to adjust the valve stroke to prevent damage to the check valve spring as a result of high fluid pressure which can result in a torque converter overheat condition.

Other objects and advantages of the modification to the "factory installed" automotive transmissions in accordance with the present invention will become apparent from the following description in conjunction with the drawings.

SUMMARY OF THE INVENTION

The primary object of the present invention is to protect the torque converter of a "factory installed" automotive transmission from damage resulting from over-pressurization. A hydraulic circuit of the automotive transmission is coupled to a converter charge circuit. When pressure exceeds a predetermined value established by a torque converter limit valve in the hydraulic circuit, a valve strokes towards a check valve spring to compress the spring and open the valve, resulting in venting of excessive converter pressure into a separate circuit coupled to pump suction. Over time, normal converter check valve activity weakens the check valve spring, causing it to malfunction or prematurely rupture, resulting in loss of converter charge pressure, resulting in severe and damaging overheating of the torque converter.

In accordance with the present invention, a spacer element is arranged to act on the valve element to limit the valve stroke, thereby limiting the compressive forces applied to the spring as the valve moves into an open position. The spacer element, by limiting the compressive forces applied to the check valve spring, reduce the wear on the spring, thereby preventing premature breakage of the spring and preventing loss of converter charge pressure which would otherwise result in severe overheating of the torque converter.

It is also within the scope of the present invention to limit movement of the valve element as the valve element moves into a closed position to limit the expansive forces applied to the spring.

BRIEF DESCRIPTION OF THE DRAWINGS

FIG. 2 illustrates a portion of the hydraulic circuitry of the automotive transmission illustrated by FIG. 1, showing the torque converter check valve in a closed position;

FIG. 3 illustrates the portion of the hydraulic circuitry illustrated by FIG. 2, showing the torque converter check valve in an open position; and FIG. 4 illustrates the portion of the hydraulic circuitry illustrated by FIG. 3, as modified in accordance with the present invention.

DESCRIPTION OF THE BEST MODES FOR CARRYING OUT THE INVENTION

Figure 1:
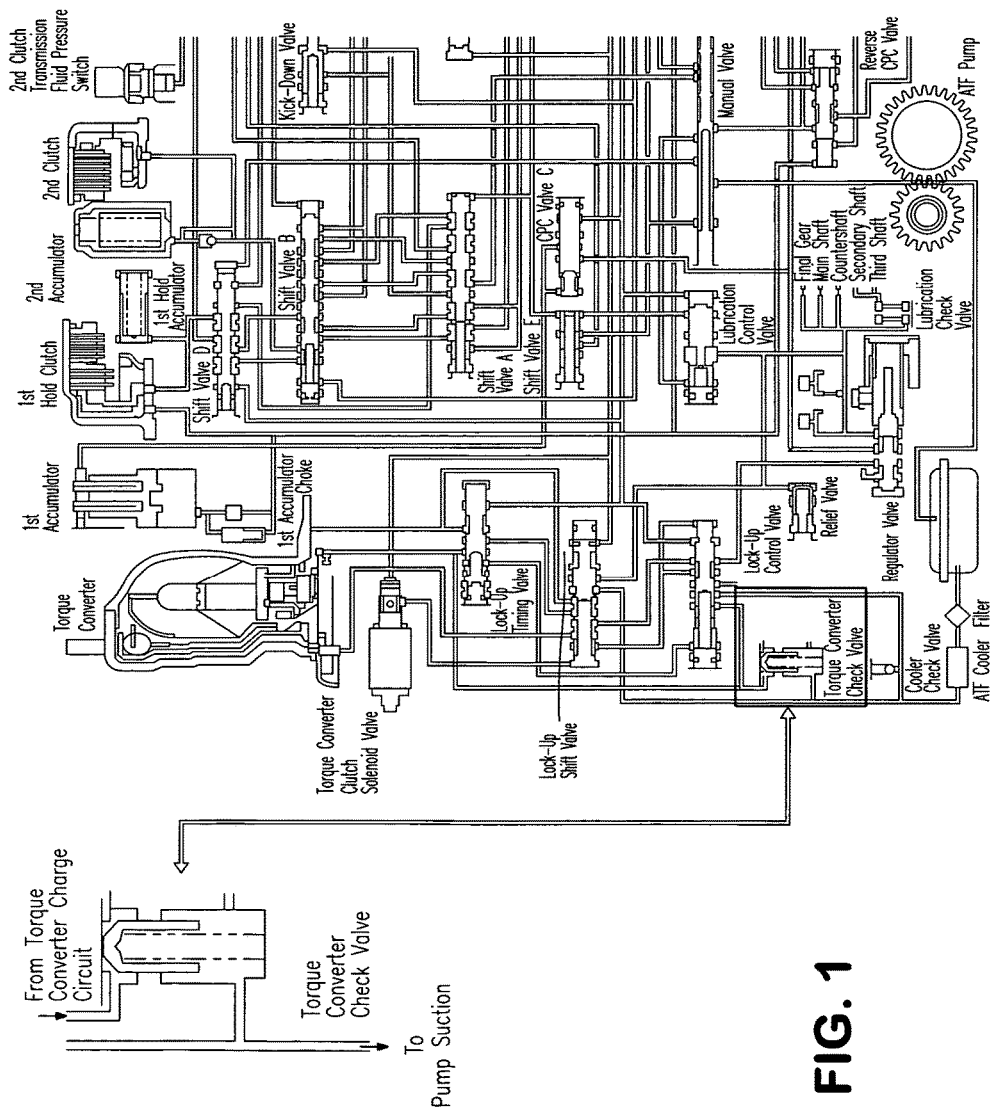
FIG. 1 illustrates, in part, the hydraulic circuitry of a "factory installed" automotive transmission for a motor vehicle.

FIG. 1 of the drawing illustrates a portion of the overall hydraulic circuitry of a "factory installed" automotive transmission for a 4 and 5 speed 98-04 Honda Odyssey, and for the Acura 3.2 TL. The overall hydraulic circuitry of these "factory installed" automotive transmissions is known to, and understood by, persons skilled in the relevant art.

FIG. 2 of the drawing illustrates a portion of the hydraulic circuitry illustrated by FIG. 1, isolating the torque converter check valve, which is generally designated by reference numeral 2 in FIG. 2. In FIG. 2 of the drawing, the torque converter check valve is illustrated as being in its fully closed position. The torque converter check valve includes a valve element designated by reference numeral 4, a check valve spring designated by reference numeral 6, a fluid flow line designated by reference numeral 8, and a fluid flow line designated by reference numeral 10. The valve element is movable within a housing 3 having a closed planar bottom side 5. In the closed position of the torque converter check valve 2, the valve element 4 is in its uppermost position, blocking incoming hydraulic fluid from a torque converter charge circuit through line 8. The valve element 4 is maintained in its uppermost position as a result of the resilient force of the check valve spring 6, in its expanded state, acting on the inside of the valve element 4. When the torque converter check valve is in its closed position as illustrated by FIG. 2, hydraulic fluid flows through line 10 as a result of suction created by a pump (not shown) coupled to line 10. The hydraulic pressure applied to the outside of the valve element 4 through the line 8 is less than the resilient force of the spring 6 applied to the inside of the valve element 4 to maintain the torque converter check valve in its closed position, as illustrated by FIG. 2. When the hydraulic pressure applied to the outside of the valve element 4 during a downstroke (movement of the valve element from the closed position into the open position), excess hydraulic pressure is vented by the suction in line 10 which is coupled to a suction pump (FIG. 3 of the drawing).

FIG. 3 illustrates the torque converter check valve shown in FIG. 2, when the valve is moved into its fully opened position. This occurs when the pressure of the hydraulic fluid applied to the outside of the valve element 4 through the line 8 exceeds the resilient force applied by the check valve spring 6 against the inside of the valve element 4. In the fully opened position of the torque converter check valve as shown by FIG. 3, the valve element 4 has moved into its lowermost position and will abut against the planar bottom surface 5 of the housing 3, and the check valve spring is in its most compressed position. Thus, when the valve element 4 moves in a downward stroke from its maximum upper position when the torque converter check valve is fully closed (FIG. 2) into its maximum, lower position when the torque converter check valve is fully opened (FIG. 3), the check valve spring 6 moves from a fully expanded state into a fully compressed state.

As the result of the continuous expansion and contraction of the check valve spring 6 during normal operation of the automotive transmission, the spring becomes weakened and subject to premature breakage. Failure of the check valve spring results in loss of the converter charge pressure from line 8, causing severe overheating of the torque converter.

FIG. 4 of the drawing illustrates a modification to the "factory installed" automotive transmissions in accordance with the present invention. A spacer element designated by reference numeral 12 is provided to act on the inside of the valve element 4 during the down stroke of the valve element 4 as it moves from its closed position to its opened position. Preferably, the spacer element is mounted to the proximate center of the inside of the top surface of the valve element, and extends longitudinally downwardly therefrom. As illustrated by FIG. 4, the spacer element 12 prevents the valve element 4 from moving into its maximum downward position (as illustrated by FIG. 3) when the torque converter check valve is in its fully opened position in which the spacer element abuts against the planar bottom surface 5 of the housing 3. Preferably, the spacer element is arranged within the spring which also acts on the inside of the top surface of the valve element. In this manner, the check valve spring 6 is not fully compressed when the torque converter check valve in its fully open position as illustrated FIG. 4, As such, the wear on the check valve spring is reduced during normal operation of the automotive transmission as the check valve spring is moved from its maximum expanded state into its modified maximum compressed state as a result of the spacer element 12 which limits the downward stroke of the valve element 4. The life of the check valve spring is increased, while the possibility of premature failure of the check valve spring is reduced, thereby preventing or reducing the possibility of loss of converter charge pressure and the resultant overheating of the torque converter.

The spacer element can be formed from any suitable material, such as a lightweight durable metal or metal alloy.

In addition to employing the stroke limit spacer 12 to reduce the stress and wear of the check valve spring, the present invention also employs a more durable check valve spring then currently employed in the "factory installed" automotive transmissions. In the preferred embodiment of the present invention, the check valve spring is a chrome silicon wire spring. Accordingly, the use of a more durable check valve spring in combination with the use of a stroke limiting spacer in accordance with the preferred embodiment of the present invention, extends the operating life of the check valve spring, reducing the possibility of loss of converter charge pressure and the resulting overheating of the torque converter which would otherwise be caused by premature failure of the check valve spring.

As disclosed and illustrated herein, in the preferred embodiment of the invention the spacer element is arranged so as to limit movement of the valve element on its downstroke as the torque converter check valve moves between a fully closed position and a fully opened position, to limit the degree of compression of the check valve spring. It is also within the scope of the present invention to reverse this arrangement so that the spacer element is arranged to act on the outside of the top surface of the valve element and limit movement of the valve element on its upstroke as the torque converter check valve moves from the open position (FIG. 3) to the closed position (FIG. 2) to reduce the degree of expansion of the check valve spring. In either embodiment of the invention, wear of the check valve spring is reduced by reducing either the compression or expansion of the check valve spring as the valve element moves between closed and opened positions.

Other improvements and advantages within the scope of the present invention will be apparent to persons skilled in the relevant art. Accordingly, the description of the preferred embodiments of the invention made herein are intended to be illustrative only, and not restrictive of the scope of the invention, that scope being defined by the following claims and all equivalents thereto.

The invention claimed is:

1. A method of converting an automotive transmission, said method comprising the steps of:

providing a torque converter check valve having a valve element movable within a housing having at least one planar side between a fully closed position and a fully opened position as a result of hydraulic pressure applied to said valve element to move said valve element in a first direction, and a resilient element applying a resilient force on said valve element to move said valve element in a second direction, said fully opened position and said fully closed position being separated by a predetermined distance, converting said automotive transmission by limiting the movement of said valve element to prevent said valve element from moving into said fully opened position for reducing wear on said resilient element by mounting a separate spacer element directly on said valve element such that said spacer element is conjointly movable with said valve element;

arranging said resilient element to be in direct contact with said at least one planar side of said housing; and arranging said valve element and said spacer element such that when said valve element is moved from said fully closed position in a direction towards said fully opened position, said spacer element abuts against said at least one planar side of said housing before said valve element moves said predetermined distance so that said valve element is not in said fully opened position when said valve element is moved a maximum distance in a direction towards said fully opened position.

2. The method in accordance with claim 1, further including the step of arranging said spacer element to limit movement of the valve element in a direction in which said resilient element is compressed.

3. The method in accordance with claim 2, further including the step of applying the hydraulic pressure to the valve element so as to move the valve element in the direction which compresses the resilient element.

4. The method in accordance with claim 1, wherein said hydraulic pressure acts on said valve element to move said valve element in said first direction from a closed position towards an opened position, and said resilient element acts on said valve element in said second direction to move said valve element from an opened position towards a closed position, the steps of said method further including:
arranging said spacer element to limit the distance which said valve element moves between a fully closed position and a fully open position.

5. The method in accordance with claim 1, further including the step of:
arranging said resilient element to apply said resilient force on the inside of said valve element.

6. The method in accordance with claim 1, further including the step of:
applying said hydraulic pressure to the outside of said valve element.

7. The method in accordance with claim 1, wherein said resilient element is a spring.

8. In a torque converter check valve for an automotive transmission, said torque converter check valve including a valve element, a housing having at least one planar side for said valve element, a resilient element acting on said valve element to move said valve element in said housing in a first direction, said valve element being movable in said housing in a second direction upon the application of hydraulic pressure to said valve element, said valve element being movable in said housing between a fully opened position and a fully closed position, said fully opened position and said fully closed position being separated by a predetermined distance, said resilient element being expanded when said valve element moves in said first direction, and said resilient element being compressed when said valve element moves in said second direction, the improvement comprising a separate spacer element directly mounted on said valve element and conjointly movable with said valve element for limiting movement of said valve element to prevent said valve element from moving into said fully opened position; said valve element and said spacer element being arranged such that when said valve element is moved from said fully closed position in a direction towards said fully opened position, said spacer element abuts against said at least one planar side of said housing before said valve element moves said predetermined distance into said fully opened position so that said valve element is not in said fully opened position when said valve element is moved a maximum distance in a direction towards said fully opened position; said resilient element arranged to be in direct contact with said at least one planar side of said housing.

9. The torque converter check valve in accordance with claim 8, wherein the spacer element is arranged to limit movement of the valve element in the second direction to limit the compression of the resilient element when the valve element is moved in the second direction.

10. The torque converter check valve in accordance with claim 9, wherein said spacer element is arranged to limit the distance that said valve element moves in said second direction from a closed position into an opened position.

11. The torque converter check valve in accordance with claim 10, wherein said spacer element is arranged to cooperate with the inside of said valve element.

12. The torque converter check valve in accordance with claim 11, wherein said resilient element is arranged to act on the inside of said valve element, and said spacer element is arranged inside of said resilient element.

13. The torque converter check valve as claimed in claim 8, wherein movement of the valve element in the first direction closes the torque converter check valve.

14. The torque converter check valve as claimed in claim 8, wherein movement of the valve element in the second direction opens the torque converter check valve.

15. The torque converter check valve as claimed in claim 8, wherein the valve element is arranged to receive said applied hydraulic pressure on the outside of the valve element for moving the valve element in said second direction for opening the torque converter check valve.

16. The torque converter check valve as claimed in claim 8, wherein said resilient element is arranged to apply a resilient force on the inside of said valve element for moving the valve element in said first direction for closing the torque converter check valve.

17. The torque converter check valve in accordance with claim 8, wherein said resilient element is a chrome silicon wire spring.

18. In a torque converter check valve for an automotive transmission, said torque converter check valve including a valve element, a housing having at least one planar side for said valve element, a resilient element acting on said valve element for moving said valve element between a fully opened position and a fully closed position, said fully opened position and said fully closed position being separated by a predetermined distance, said valve element being movable in said housing by hydraulic pressure applied to said valve element, said hydraulic pressure applied to said valve element exceeding said resilient force applied to said valve element when said valve element is moved in a direction from said fully closed position towards said fully opened position wherein said resilient element is compressed when said valve element is moved in a direction from said fully closed position towards said fully opened position, the improvement comprising a separate spacer element directly mounted on said valve element and conjointly movable with said valve element for limiting the distance travelled by said valve element towards said fully opened position for preventing said valve element from moving into said fully opened position when said valve element is moved in a direction from said fully closed position towards said fully opened position, said valve element and said spacer element being arranged such that when said valve element moves from said fully closed position in a direction towards said fully opened position, said spacer element abuts against said at least one planar side of said housing before said valve element moves said predetermined distance so that said valve element is not in said fully opened position when said valve element moves a maximum distance in a direction towards said fully opened position, said resilient element arranged to be in direct contact with said at least one planar side of said housing, wherein said spacer element reduces the degree to which said resilient element is compressed when said valve element is moved in said direction towards said fully opened position.

19. The torque converter check valve in accordance with claim 18, wherein both said spacer element and said resilient element are arranged to act on the inside of said valve element.

20. The torque converter check valve in accordance with claim 19, wherein said spacer element is arranged within said resilient element.

* * * * *